United States Patent
Logan et al.

(10) Patent No.: US 6,804,770 B2
(45) Date of Patent: Oct. 12, 2004

(54) METHOD AND APPARATUS FOR USING PAST HISTORY TO AVOID FLUSH CONDITIONS IN A MICROPROCESSOR

(75) Inventors: Douglas Robert Logan, Austin, TX (US); Alexander Erik Mericas, Austin, TX (US); William John Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 09/815,553

(22) Filed: Mar. 22, 2001

(65) Prior Publication Data

US 2002/0138713 A1 Sep. 26, 2002

(51) Int. Cl.[7] .............................. G06F 9/312; G06F 9/44
(52) U.S. Cl. ....................... 712/215; 712/245; 712/231; 711/135
(58) Field of Search ................................ 712/210, 241, 712/214, 216, 219, 226, 227, 239, 240, 245, 244, 248, 215, 231; 711/168, 169, 213, 219, 135

(56) References Cited

U.S. PATENT DOCUMENTS

| | | | |
|---|---|---|---|
| 4,998,796 A | 3/1991 | Bonanni et al. .......... 350/96.21 |
| 5,121,457 A | 6/1992 | Foley et al. .................. 385/89 |
| 5,337,388 A | 8/1994 | Jacobowitz et al. .......... 385/76 |
| 5,420,954 A | 5/1995 | Swirhun et al. ............... 385/92 |
| 5,481,629 A | 1/1996 | Tabuchi ....................... 385/14 |
| 5,515,468 A | 5/1996 | DeAndrea et al. ............ 385/88 |
| 5,574,814 A | 11/1996 | Noddings et al. ............. 385/90 |
| 5,631,988 A | 5/1997 | Swirhun et al. .............. 385/89 |
| 5,774,614 A | 6/1998 | Gilliland et al. .............. 385/88 |
| 5,958,041 A * | 9/1999 | Petolino et al. ............. 712/214 |
| 6,045,270 A | 4/2000 | Weiss et al. .................. 385/59 |
| 6,112,001 A | 8/2000 | Kishida et al. ............... 385/49 |
| 6,118,910 A | 9/2000 | Chang ......................... 385/16 |
| 6,470,438 B1 * | 10/2002 | McCormick, Jr. ........... 711/210 |
| 6,629,238 B1 * | 9/2003 | Arora et al. ................ 712/241 |

FOREIGN PATENT DOCUMENTS

WO     WO 00/31771     6/2000

\* cited by examiner

*Primary Examiner*—Daniel H. Pan
(74) *Attorney, Agent, or Firm*—Duke W. Yee; Mark E. McBurney; Lisa L. B. Yociss

(57) ABSTRACT

A hazard prediction array consists of an array of saturating counters. The array is indexed through a portion of the instruction address. At issue, the hazard prediction array is referenced and a prediction is made as to whether the current instruction or group of instructions is likely to encounter a flush. If the prediction is that it will flush, the instruction is not issued until it is the next instruction to complete. If the prediction is that the instruction will not flush, it is issued as normal. At completion time, the prediction array is updated with the actual flush behavior. When an instruction is predicted to flush and, thus, not issued until it is the next to complete, the predictor may be updated as if the instruction did not flush.

21 Claims, 2 Drawing Sheets

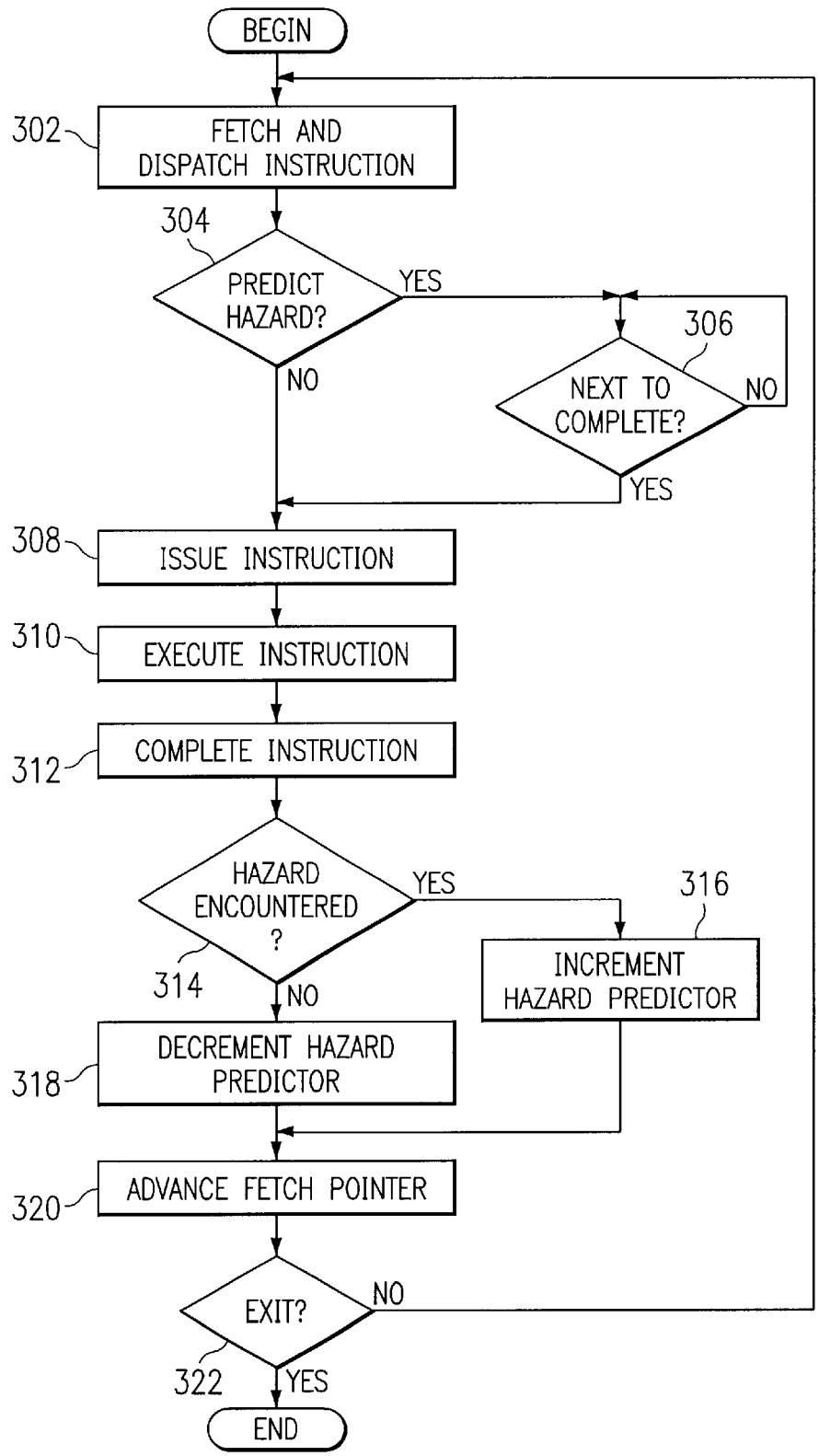

ID OF USING PAST HISTORY TO AVOID FLUSH CONDITIONS IN A MICROPROCESSOR

BACKGROUND OF THE INVENTION

1. Technical Field

The present invention relates to data processing and, in particular, to hazard prediction in a microprocessor design. Still more particularly, the present invention provides a method and apparatus for using past history to avoid flush conditions in a microprocessor design.

2. Description of Related Art

Pipeline processing is a technique that provides simultaneous, or parallel, processing within a computer. It refers to overlapping operations by moving data or instructions into a conceptual pipe with all stages of the pipe processing simultaneously. For example, while one instruction is being executed, the computer may be decoding the next instruction. In vector processors, several steps in a floating point operation may be processed simultaneously.

The pipeline is divided into segments and each segment can execute its operation concurrently with the other segments. When a segment completes an operation, it passes the result to the next segment in the pipeline and fetches the next operation from the preceding segment. The final results of each instruction emerge at the end of the pipeline in rapid succession.

Out of order execution is a technique used to gain an edge in speed and performance. However, occasionally out of order execution may create a hazard. A hazard may cause the microprocessor to flush the fetched but incomplete instructions from the pipeline stages and to subsequently refill the pipe. However, as the number of pipeline stages in a processor increases, the overhead of flushing and refilling the pipe also increases. For long pipelines, it may be better to stall the pipe than to flush and restart it.

Therefore, it would be advantageous to provide a method and apparatus for using past history to avoid flush conditions in a microprocessor.

SUMMARY OF THE INVENTION

The present invention provides a hazard prediction array consisting of an array of saturating counters. The array is indexed through a portion of the instruction address. At issue, the hazard prediction array is referenced and a prediction is made as to whether the current instruction or group of instructions is likely to encounter a flush. If the prediction is that it will flush, the instruction is not issued until it is the next instruction to complete. If the prediction is that the instruction will not flush, it is issued as normal. At completion time, the prediction array is updated with the actual flush behavior. When an instruction is predicted to flush and, thus, not issued until it is the next to complete, the predictor may be updated as if the instruction did not flush.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a flowchart illustrating the operation of a processor with hazard prediction in accordance with a preferred embodiment of the present invention.

DETAILED DESCRIPTION OF THE PREFERRED EMBODIMENT

Figure 1:
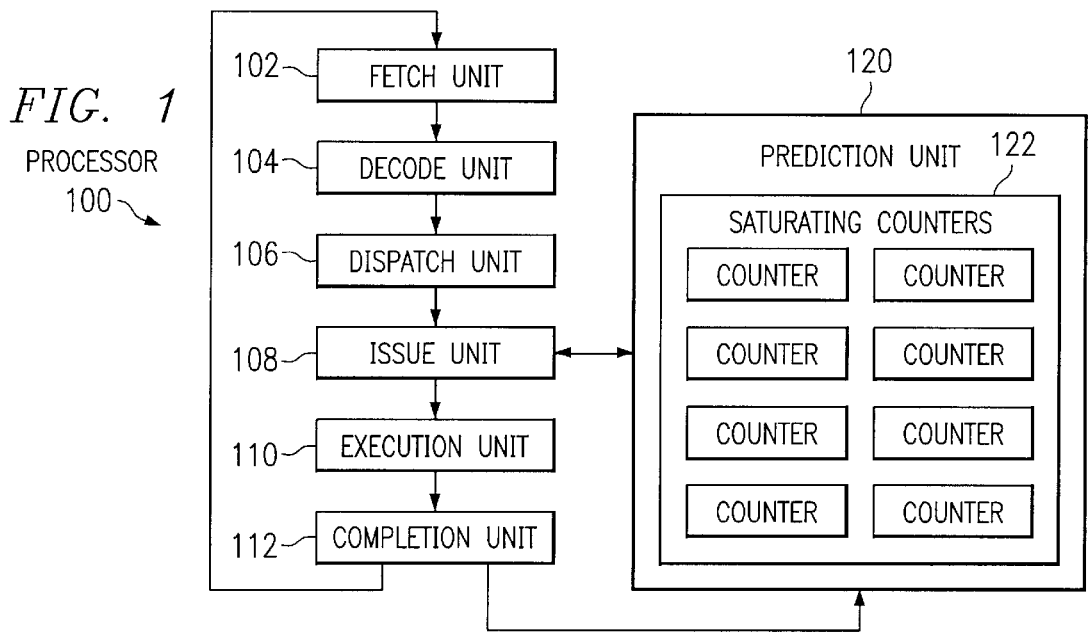
FIG. 1 is a pictorial representation of a microprocessor design in which the present invention may be implemented in accordance with a preferred embodiment of the present invention.

With reference now to the figures and in particular with reference to FIG. 1, a pictorial representation of a microprocessor design in which the present invention may be implemented is depicted in accordance with a preferred embodiment of the present invention. Processor 100 includes fetch unit 102 for fetching instructions and decode unit 104 for decoding instructions. Instructions are dispatched at dispatch unit 106 and fed to issue unit 108. Issue unit 108 may include an issue queue from which instructions are sent to execution unit 110. Upon execution, instructions are completed at completion unit 112. Completion may include memory reference or write back to registers.

According to a preferred embodiment of the present invention, processor 100 includes prediction unit 120. A hazard may be a condition which causes or is likely to cause the microprocessor to flush the fetched but incomplete instructions from the pipeline stages. Prediction unit 120 comprises a hazard prediction array consisting an array of saturating counters 122. The array is indexed through a portion of the instruction address. At issue, the hazard prediction array is referenced and a prediction is made as to whether the current instruction or group of instructions is likely to encounter a flush.

If the prediction is that an instruction will encounter a flush, the instruction is not issued until it is the next instruction to complete. If the prediction is that the instruction will not flush, it is issued as normal. At completion time, the prediction array is updated with the actual flush behavior. When an instruction is predicted to flush and, thus, not issued until it is the next to complete, the predictor may be updated as if the instruction did not flush.

The prediction array may be indexed by using a modulo function. For example, in the example shown in FIG. 1, prediction unit 120 includes eight saturating counters. Therefore, the prediction unit will reference the counter corresponding to the instruction address modulo eight. Although the example shows eight saturating counters, many more may be used depending upon the number of instructions and the desired accuracy of the prediction. The first time an instruction is executed and a hazard is encountered, the corresponding counter is incremented. If the instruction is executed and a hazard is not encountered, the counter is decremented.

A saturating counter does not roll back to zero after the highest number is reached. Thus, when the highest number has been reached and the counter attempts to increment, the counter saturates and the prediction unit predicts that a hazard will occur. The size, in number of bits, of the counter determines the tolerance of the predictor. A two-bit saturation counter may be used as a starting point; however, any number of bits may be used depending on the desired tolerance of the prediction unit. A person of ordinary skill in the art will realize that other configurations of counters may also be used.

The present invention may also provide a mechanism for correcting prediction unit 120. According to a preferred embodiment of the present invention, the prediction unit may decrement a counter when a corresponding instruction does not encounter a hazard. Thus, if an instruction is not issued until it is the next instruction to complete, then a hazard will not be encountered and the corresponding counter is decremented. Alternatively, prediction unit 120 may only decrement the counter if it does not predict a hazard and a hazard is not encountered.

While the example of FIG. 1 shows the prediction unit as part of processor 100, prediction unit 120 may be a separate component. Alternatively, prediction unit 120 may be modeled in software instead of actually being fabricated. The prediction unit may also be embodied as software, such as code within an operating system, or a combination of hardware and software, such as firmware.

Figure 2:
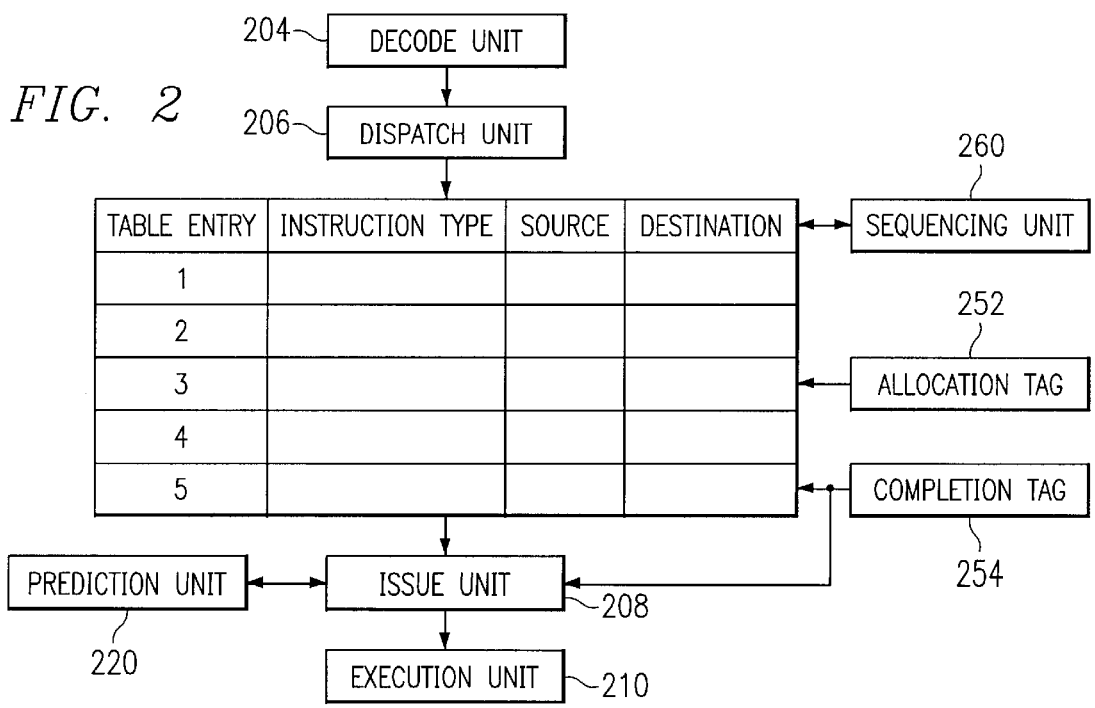
FIG. 2 is a block diagram illustrating the components used to issue instructions in accordance with a preferred embodiment of the present invention.

With reference to FIG. 2, a block diagram is shown illustrating the components used to issue instructions in accordance with a preferred embodiment of the present invention. Decode unit 204 decodes instructions to determine basic information about the instruction, such as instruction type, source registers, and destination registers. Sequencing unit 260 uses the decoded information to schedule instructions for execution. In order to track instructions, completion table 250 is used for storing and retrieving information about scheduled instructions. The completion table may also be referred to as a reorder buffer.

As sequencing unit 260 assigns the dispatched instruction to an associated entry in completion table 250, sequencing unit 260 assigns or associates entries to executing instructions on a first-in, first-out basis or rotating manner. As the instructions are executed, information concerning the executing instructions is stored into various fields and subfields of the associated entry of completion table 250 for the particular instruction.

Completion table 250 is organized as a circular list with each entry in the completion table tracking a single instruction. An instruction is said to have a "tag value" equal to its index value into the completion table. The tag value associated with an instruction may be used to identify events caused by the execution of the instruction. Allocation tag 252 holds the index of the next available entry. Completion tag 254 holds the index of the next completing instruction. If no completion table entries are available, the sequencing unit of the processor stalls until an entry is available.

FIG. 2 shows exemplary data within completion table 250 in which the completion tag points to entry 5 and the allocation tag points to entry 3. The instruction in entry 5 is next to complete. Instructions in entries 1–2 can be waiting to execute, currently executing, or waiting to complete. The next instruction that is decoded will be placed into entry 3 and the allocation pointer will increment to point to entry 4. If the allocation pointer points to entry 5, then it will wrap to zero instead of incrementing to non-existent entry 6, i.e. the pointers wrap in a circular fashion. In this example, if the allocation pointer pointed to entry 4, no more entries would be available.

Alternatively, a single completion table entry may be allocated for a group of instructions. All of the instructions within the group would then be tracked with a single tag value.

Issue unit 208 issues the instructions, possibly out of order with respect to the order the programmer coded, from the completion table to execution unit 210. In accordance with a preferred embodiment of the present invention, issue unit 208 references prediction unit 220 to determine whether a hazard is predicted. If a hazard is predicted, then the issue unit holds the instruction until the completion tag points to the instruction to be issued. When the completion tag increments, in the circular fashion discussed above, until it is equal to the instruction to be issued, then the instruction is issued to the execution unit. If, however, a hazard is not predicted, then the instruction is issued as normal.

With reference now to FIG. 3, a flowchart is shown illustrating the operation of a processor with hazard prediction in accordance with a preferred embodiment of the present invention. The process begins and fetches and dispatches an instruction (step 303). A determination is made as to whether a hazard is predicted (step 304). If a hazard is predicted, a determination is made as to whether the instruction is the next instruction to complete (step 306). If the instruction is the next instruction to complete, the process issues the instruction (step 308); otherwise, the process returns to step 306 until the instruction is the next to complete. If a hazard is not predicted in step 304, the process proceeds directly to step 308 to issue the instruction.

After the instruction is issued, the process executes the instruction (step 310) and completes the instruction (step 312). A determination is made as to whether a hazard is encountered (step 314). If a hazard is encountered, the process increments the corresponding counter in the prediction unit (step 316) and advances the fetch pointer (step 320) to fetch the next instruction. If a hazard is not encountered in step 314, the process decrements the corresponding counter in the prediction unit (step 318) and proceeds to step 320 to advance the fetch pointer.

Thereafter, a determination is made as to whether an exit condition exists (step 322). An exit condition may be a condition that halts execution, such as a last instruction being executed. A last instruction may be a halt or attention type instruction that causes the processor to stop. Alternatively, an unrecoverable error may stop the process (i.e. power-off, hardware failure). If an exit condition exists, the process ends. If an exit condition does not exist in step 322, the process returns to step 302 to fetch the next instruction.

Thus, the present invention solves the disadvantages of the prior art by providing a hazard prediction mechanism. If the prediction is that it will flush, the instruction is not issued until it is the next instruction to complete. If the prediction is that the instruction will not flush, it is issued as normal. At completion time, the prediction array is updated with the actual flush behavior. When an instruction is predicted to flush and, thus, not issued until it is the next to complete, the predictor may be updated as if the instruction did not flush. Therefore, the present invention avoids costly flushing and refilling of the pipe and increases processor efficiency.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for using past history to avoid flush conditions in a processor, comprising:

fetching an instruction;

predicting whether the instruction will encounter a hazard;

in response to predicting that the instruction will encounter a hazard, postponing issuing the instruction until the instruction is a next instruction to be completed;

completing instructions, including the instruction, after the instructions have been executed; and in response to predicting that the instruction will not encounter a hazard, issuing the instruction normally regardless of whether the instruction is a next instruction to be completed.

2. The method of claim 1, wherein the step of predicting that the instruction will encounter a hazard comprises referencing a prediction counter corresponding to the instruction.

3. The method of claim 2, further comprising:

executing the instruction;

determining, using a completion tag, whether the instruction is a next instruction to be completed, the completion tag including an index that indicates a next instruction to be completed;

completing the instruction by writing back results of the executing of the instruction; and determining whether a hazard is encountered.

4. The method of claim 3, further comprising:

incrementing the prediction counter if a hazard is encountered.

5. The method of claim 3, further comprising:

performing a pipeline flush if a hazard is encountered.

6. The method of claim 3, further comprising:

decrementing the prediction counter if a hazard is not encountered.

7. The method of claim 2, wherein the prediction counter is a saturation counter.

8. An apparatus for using past history to avoid flush conditions in a processor, comprising:

a fetch unit that fetches an instruction;

a prediction unit that predicts whether the instruction will encounter a hazard;

a completion unit for completing instructions, including the instruction, after the instructions have been executed;

a completion tag that points to a tagged instruction in the completion unit for determining whether the instruction is a next instruction to be completed, the tagged instruction being a next instruction to be completed;

in response to predicting that the instruction will encounter a hazard, postponing issuing the instruction until the instruction is a next instruction to be completed; and in response to predicting that the instruction will not encounter a hazard, issuing the instruction normally regardless of whether the instruction is a next instruction to be completed.

9. The apparatus of claim 8, wherein the prediction unit comprises an array of counters.

10. The apparatus of claim 9, wherein the array of counters comprises a prediction counter corresponding to the instruction.

11. The apparatus of claim 10, wherein the prediction counter is indexed by calculating the instruction modulo the number of counters in the array.

12. The apparatus of claim 10, wherein the prediction counter is a saturation counter.

13. The apparatus of claim 10, wherein the prediction unit increments the prediction counter if a hazard is encountered.

14. The apparatus of claim 10, wherein the prediction unit decrements the prediction counter if a hazard is not encountered.

15. An apparatus for using past history to avoid flush conditions in a processor, comprising:

fetch means for fetching an instruction;

prediction means for predicting whether the instruction will encounter a hazard;

in response to predicting that the instruction will encounter a hazard, issue means for postponing issuing the instruction until the instruction is a next instruction to be completed;

a completion unit for completing instructions, including the instruction, after the instructions have been executed; and in response to predicting that the instruction will not encounter a hazard, the issue means for issuing the instruction normally regardless of whether the instruction is a next instruction to be completed.

16. The apparatus of claim 15, wherein the prediction means comprises means for referencing a prediction counter corresponding to the instruction.

17. The apparatus of claim 16, further comprising:

execution means for executing the instruction;

a completion tag for determining whether the instruction is a next instruction to be completed, said completion tag including an index that indicates a next instruction to be completed;

a completion unit for completing the instruction by writing back results of the executing of the instruction; and determination means for determining whether a hazard is encountered.

18. The apparatus of claim 17, further comprising:

means for incrementing the prediction counter if a hazard is encountered.

19. The apparatus of claim 17, further comprising:

means for performing a pipeline flush if a hazard is encountered.

20. The apparatus of claim 17, further comprising:

means for decrementing the prediction counter if a hazard is not encountered.

21. The apparatus of claim 20, wherein the prediction counter is a saturation counter.

* * * * *